US006579339B1

(12) United States Patent
Jamison et al.

(10) Patent No.: US 6,579,339 B1
(45) Date of Patent: *Jun. 17, 2003

(54) COPPER SCRAP PROCESSING SYSTEM

(75) Inventors: Tommy Jamison, Hernando, MS (US);
Paul D. Babin, Collierville, TN (US);
Glenn Dennis, Collierville, TN (US);
Allen Popetz, Fulton, MS (US)

(73) Assignee: Mueller Industries, Inc., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/238,394

(22) Filed: Sep. 10, 2002

Related U.S. Application Data

(63) Continuation of application No. 09/944,972, filed on Aug. 31, 2001, now Pat. No. 6,478,847.

(51) Int. Cl.$^7$ ................................................ C22B 15/14
(52) U.S. Cl. ............................ 75/386; 75/414; 75/638
(58) Field of Search .......................... 75/386, 414, 638

(56) References Cited

U.S. PATENT DOCUMENTS

| | | |
|---|---|---|
| 3,967,958 A | 7/1976 | Coffield et al. |
| 3,975,190 A | 8/1976 | VanDerMeulen et al. |
| 3,990,890 A | 11/1976 | Leroy |
| 4,002,544 A | 1/1977 | Heimala et al. |
| 4,038,068 A | 7/1977 | Tyler et al. |
| 4,055,415 A | 10/1977 | Stefan et al. |
| 4,073,646 A | 2/1978 | Kryczun et al. |
| 4,086,082 A | 4/1978 | Mahalla |
| 4,090,870 A | 5/1978 | Pollock et al. |
| 4,094,668 A | 6/1978 | Yannopoulos et al. |
| 4,139,371 A | 2/1979 | Makipirtti et al. |
| 4,144,055 A | 3/1979 | Petersson et al. |
| 4,149,880 A | 4/1979 | Prater et al. |
| 4,204,861 A | 5/1980 | Petersson et al. |
| 4,284,428 A | 8/1981 | Canning, Jr. |
| 4,304,644 A | 12/1981 | Victorovich et al. |
| 4,315,775 A | 2/1982 | Odle et al. |
| 4,316,742 A | 2/1982 | Canning, Jr. |
| 4,318,737 A | 3/1982 | Canning, Jr. |
| 4,322,390 A | 3/1982 | Tolley et al. |
| 4,444,586 A | 4/1984 | Bienus et al. |
| 4,468,302 A | 8/1984 | Parker et al. |
| 4,504,309 A | 3/1985 | Mackey et al. |
| 4,515,631 A | 5/1985 | Lindquist et al. |
| 4,544,141 A | 10/1985 | Mackey et al. |
| 4,925,488 A | 5/1990 | Blander et al. |
| 5,133,948 A | 7/1992 | King et al. |
| 5,306,328 A | 4/1994 | Streckel et al. |
| 5,364,449 A | 11/1994 | Nakamura et al. |
| 5,435,833 A | 7/1995 | Bustos |
| 5,449,395 A | 9/1995 | George |
| 5,685,892 A | 11/1997 | Ikoma et al. |
| 5,888,270 A | 3/1999 | Edwards et al. |
| 5,948,137 A | 9/1999 | Pflaum |
| RE36,598 E | 3/2000 | George |
| 6,042,632 A | 3/2000 | George |
| 6,106,587 A | 8/2000 | Edlinger |
| 6,478,847 B1 * | 11/2002 | Jamison et al. ............... 75/386 |

FOREIGN PATENT DOCUMENTS

JP 61-264139 11/1986

* cited by examiner

*Primary Examiner*—Melvyn Andrews
(74) *Attorney, Agent, or Firm*—Harness, Dickey & Pierce, P.L.C.

(57) ABSTRACT

A system is described for forming a recycled copper product from at least one copper scrap feedstock source containing at least one contaminant. A pre-determined maximum weight percentage of the contaminant in the recycled copper product is initially established. The weight percentage of the contaminant in the copper scrap feedstock source is then determined. A determination is then made as to whether the weight percentage of the contaminant in the copper scrap feedstock source will exceed the established maximum weight percentage of the contaminant in the recycled copper product. If so, another copper scrap feedstock source is then added to the first copper feedstock source so as to cause the combined copper scrap feedstock sources to have an average weight percentage of the contaminant that does not exceed the established maximum weight percentage of the contaminant in the recycled copper product.

53 Claims, No Drawings

COPPER SCRAP PROCESSING SYSTEM

CROSS-REFERENCE TO RELATED APPLICATIONS

This application is a continuation of U.S. patent application Ser. No. 09/944,972 filed on Aug. 31, 2001 now U.S. Pat. No. 6,478,847. The disclosure of the above application is incorporated herein by reference.

FIELD OF THE INVENTION

The present invention relates generally to the recycling and processing of scrap copper, and more particularly to a new and improved copper scrap processing system that optimizes the feedstock selection ratios of various sources of relatively inexpensive copper scrap feedstocks in order to more efficiently produce a recycled copper product having pre-determined acceptable levels of various contaminants.

BACKGROUND OF THE INVENTION

Within most metal fabrication industries, a key component of the manufacturing processes is the recycling of scrap metal for use as a raw feedstock material. Scrap metal is often collected and melted down for use in manufacturing new metal products. The ability to recycle scrap metal efficiently is a key objective in any metal recycling operation. Within an metal casting and refining operation, it is desirable to produce a metal that is as free of impurities as possible. Impurities, or contaminants as they are also known, are those constituents that exist in some or all of the scrap feedstock. The metal manufacturer seeks to minimize the amount of impurities in its final product.

Within the copper manufacturing industry, most standards for products employing copper require a purity content of at least 99.9 weight percent copper. If the scrap copper feedstock used in producing a final metal product is less than 99.9 weight percent copper, then such scrap must be blended with a more pure copper feedstock in the initial melting process, and possibly further refined after that, in order to produce a final metal product that is 99.9 weight percent pure copper. Pure copper cathode, which is 99.99 weight percent pure copper, is often used to blend with, and dilute, the impurities contained in scrap feedstock.

Copper scrap typically falls into one of the following generally recognized exemplary categories: No. 1 heavy scrap copper which consists of clean unalloyed copper solids and must be uncoated; No. 2 heavy scrap copper which consists of clean unalloyed copper solids that can be coated; soldered copper pipe which consists of assorted copper pipe (of any length) with soldered joints or ends, which are free of brass or bronze or non-copper fittings; beryllium copper which consists of clean beryllium alloyed copper solids, and may contain clippings, punchings, bar or pipe, tubing, and elbows; light copper scrap which consists of miscellaneous, unalloyed copper solids; copper turnings which consist of unalloyed copper turnings, grindings, or borings, which may be contaminated with cutting oils; No. 1 bare bright copper wire which consists of bare, uncoated, unalloyed copper wire, not smaller than 16 gauge; No. 1 copper wire which consists of clean, uncoated, unalloyed copper wire, not smaller than 16 gauge; No. 2 copper wire which consists of clean, unalloyed copper wire, free of hair wire, brittle burnt wire, and excessive oils; No. 1 copper wire nodules which consist of No. 1 bare, uncoated, unalloyed copper wire nodules, from a chopping or shredding operation, not smaller than 16 gauge; No. 2 copper wire nodules which consist of No. 2 unalloyed copper wire nodules, from a chopping or shredding operation; No. 1 insulated copper wire which consists of plastic insulated, unalloyed, uncoated (plated) copper wire, not smaller than 16 gauge; No. 2 insulated copper wire which consists of assorted plastic insulated, unalloyed copper wire, free of heavy or double insulation; No. 3 insulated copper wire which consists of assorted plastic insulated, unalloyed copper wire, including heavy or double insulation, and plastic insulated telephone cable; and so forth.

It should be noted that not every copper scrap recycling operator uses all of the afore-mentioned categories of copper scrap; however, most copper scrap recycling operators typically use one or more of the afore-mentioned categories of copper scrap during the course of routine recycling operations.

The scrap can be in many different forms, such as it's original configuration, or it can be physically altered by compacting, baling, shredding, granulating, and the like. When copper scrap arrives at a recycling facility, it is first physically segregated into the afore-mentioned individual categories. Each category of scrap is then analyzed to determine the chemical composition thereof. Typically this is done by taking a small sample of each category of scrap, melting it, and then running the sample through one or more diagnostic instruments that can detect the presence and amount of different metallic elements. In this manner, the copper scrap recycling facility operator can quickly determine the relative quality of the particular category of copper scrap. If a particular category of scrap falls below a pre-established quality threshold (e.g., has a very high contaminant level), it is typically returned to the seller.

A complicating problem encountered by many copper scrap recycling operators is that each category of copper scrap typically contains one or more contaminants, at various levels, that need to be taken into account as to how they might impact the quality control and the sale price of the recycled copper product.

For example, impurities such as zinc (Zn), tin (Sn), lead (Pb), iron (Fe), and aluminum (Al) are of particular interest. Additionally, impurities such as antimony (Sb), arsenic (As), nickel (Ni), bismuth (Bi), cadmium (Cd), phosphorous (P), silicon (Si), sulfur (S), tellurium (Te), silver (Ag), chromium (Cr), magnesium (Mg), selenium (Se), zirconium (Zr), manganese (Mn), cobalt (Co), gold (Au), and beryllium (Be), as well as others, are also of interest. It should be noted that not every one of the afore-mentioned contaminants is present in any given grade of copper scrap; however, most grades of copper scrap will typically have one or more of the afore-mentioned contaminants present in various weight percentages.

Unfortunately, conventional copper scrap recycling operators typically combine the various sources of copper scrap together in a haphazard and poorly planned manner. The resulting recycled copper product is typically high in one or more contaminants. The recycled copper product must then be either further refined (which is very time consuming and expensive) or sold at a lower price than the operator had anticipated.

Although this problem can be improved by using copper cathode (which has very low levels of contaminants) as a feedstock source, the use of copper cathode exclusively is not economically feasible for most copper recyclers. Therefore, the problem of contaminants must eventually be addressed.

There are two primary approaches that can be used to control contaminant levels in the recycled scrap product.

First, copper scrap feedstocks having relatively low levels of contaminants can be used. However, these feedstocks tend to be relatively expensive, albeit not as expensive as copper cathode, but more expensive than lesser grades of copper scrap feedstock.

Second, copper scrap feedstocks having relatively high levels of contaminants can be used. However, it is then typically necessary to combine them with relatively high grade copper, such as copper cathode, to produce a recycled product having acceptable contaminant levels. Therefore, the cost savings attempted by using the relatively low grade copper scrap feedstocks are offset by having to supplement with relatively high grade copper to control the contaminant levels. Even if it were possible to use relatively low grade copper scrap feedstocks without resorting to supplementation with relatively high grade copper, it would typically still be necessary to refine the recycled copper to remove or lessen the amount of certain contaminants (e.g., tin, lead). This is due to the fact that most copper recyclers do not employ any significant quality controls on the selection and ratios of the relatively low grade copper scrap feedstocks that are being used. Refining is an expensive process that adds to the production costs of the resulting recycled copper product, thus offsetting any material cost savings. Furthermore, certain contaminants (e.g., beryllium, cobalt) can not be refined out and must instead be diluted by adding higher grade (i.e., relatively uncontaminated) copper feedstock. Again, dilution represents an additional processing step, thus increasing production costs.

Because different types of copper scrap contain different amounts of impurities, the ability to create an efficient blend of various types of copper scrap, along with copper cathode if necessary, producing an overall product of 99.9 weight percent pure copper can require significant skill and inputs into the process. If the final product is less than 99.9 weight percent pure, then additional time and resources must be invested into further refining the product into an acceptably pure copper product. Typical refining operations are both capital and labor intensive processes that add significant expense to overall production costs. Additionally, the primary blending agent used in raising the level of copper purity is copper cathode.

Therefore, there is a need for a new and improved copper scrap processing system that optimizes the feedstock selection ratios of various sources of relatively inexpensive copper scrap feedstocks in order to produce a recycled copper product having pre-determined acceptable levels of various contaminants.

SUMMARY OF THE INVENTION

In accordance with one embodiment of the present invention, a system is provided for forming a recycled copper product from at least one copper scrap feedstock source, wherein the at least one copper scrap feedstock source contains at least one contaminant, comprising: (1) establishing a maximum weight percentage of the at least one contaminant in the recycled copper product; (2) determining the weight percentage of the at least one contaminant which is present in the at least one copper scrap feedstock source; (3) determining whether the weight percentage of the at least one contaminant which is present in the at least one copper scrap feedstock source will exceed the established maximum weight percentage of the at least one contaminant in the recycled copper product; and (4) if the weight percentage of the at least one contaminant which is present in the at least one copper scrap feedstock source will exceed the established maximum weight percentage of the at least one contaminant in the recycled copper product, then combining the at least one copper scrap feedstock source with at least one other copper scrap feedstock source so as to cause the combined copper scrap feedstock sources to have a weight percentage of the at least one contaminant which is present in the combined copper scrap feedstock sources to not exceed the established maximum weight percentage of the at least one contaminant in the recycled copper product.

In accordance with another embodiment of the present invention, a system is provided for forming a recycled copper product from a first copper scrap feedstock source and a second copper scrap feedstock source, wherein the first copper scrap feedstock source and a second copper scrap feedstock source contain at least one contaminant, comprising: (1) establishing a maximum weight percentage of the at least one contaminant in the recycled copper product; (2) determining the weight percentage of the at least one contaminant which is present in the first copper scrap feedstock source; (3) determining the weight percentage of the at least one contaminant which is present in the second copper scrap feedstock source; (4) determining the average weight percentage of the at least one contaminant which is present in the first copper scrap feedstock source and the second copper scrap feedstock source; (5) determining whether the average weight percentage of the at least one contaminant which is present in the first copper scrap feedstock source and the second copper scrap feedstock source will exceed the established maximum weight percentage of the at least one contaminant in the recycled copper product; and (6) if the average weight percentage of the at least one contaminant which is present in the first copper scrap feedstock source and the second copper scrap feedstock source will exceed the established maximum weight percentage of the at least one contaminant in the recycled copper product, then combining the first copper scrap feedstock source and the second copper scrap feedstock source with a third copper scrap feedstock source so as to cause the combined copper scrap feedstock sources to have an average weight percentage of the at least one contaminant which is present in the combined copper scrap feedstock sources to not exceed the established maximum weight percentage of the at least one contaminant in the recycled copper product.

In accordance with still another embodiment of the present invention, a system is provided for forming a recycled copper product from a first copper scrap feedstock source and a second copper scrap feedstock source, wherein the first copper scrap feedstock source and a second copper scrap feedstock source contain at least one contaminant, comprising: (1) establishing a maximum weight percentage of the at least one contaminant in the recycled copper product; (2) determining the weight percentage of the at least one contaminant which is present in the first copper scrap feedstock source; (3) recording the weight percentage of the at least one contaminant which is present in the first copper scrap feedstock source; (4) determining the weight percentage of the at least one contaminant which is present in the second copper scrap feedstock source; (5) recording the weight percentage of the at least one contaminant which is present in the second copper scrap feedstock source; (6) determining the average weight percentage of the at least one contaminant which is present in the first copper scrap feedstock source and the second copper scrap feedstock source based upon the recorded weight percentages of the at least one contaminant which is present in the first and second copper scrap feedstock sources; (7) determining whether the average weight percentage of the at least one contaminant which is present in the first copper scrap feedstock source and the second copper scrap feedstock source will exceed the established maximum weight percentage of the at least one contaminant in the recycled copper product; and (8) if the average weight percentage of the at least one contaminant which is present in the first copper scrap feedstock source and the second copper scrap feedstock source will exceed the established maximum weight percentage of the at least one contaminant in the recycled copper product, then combining the first copper scrap feedstock source and the second copper scrap feedstock source with a third copper scrap feedstock source so as to cause the combined copper scrap feedstock sources to have an average weight percentage of the at least one contaminant which is present in the combined copper scrap feedstock sources to not exceed the established maximum weight percentage of the at least one contaminant in the recycled copper product.

Additional objects, advantages, and features of the present invention will become apparent from the following detailed description of the preferred embodiments and appended claims.

DETAILED DESCRIPTION OF THE PREFERRED EMBODIMENTS

Although the present invention is directed primarily towards the recycling of copper-containing materials, it is equally applicable to the recycling of other metal-containing scrap materials wherein the contaminant levels in the resulting recycled product is of particular concern.

As previously noted, because copper cathode is generally more expensive than copper scrap, it is desirable to minimize the amount of copper cathode used in the melting and/or refining processes. Conversely, it is highly desirable to maximize the amount of the relatively less expensive scrap feedstock that can be input into the initial melting process. In order to achieve this objective, it is critical to understand the metallurgical composition of each load of scrap feedstock being charged for melting. By ascertaining the types and quantities of impurities going into the charging process, the manufacturer will be able to more efficiently minimize the use of further refining processes and resources, thereby avoiding additional costs to the overall casting operation.

The present invention achieves this objective by systematically categorizing and organizing copper scrap prior to the initial charge for blending. Therefore, a recycling manufacturer can avoid additional operating costs and material costs related to further blending or refining the copper products. Through the development of a reliable system for maximizing the utilization of copper scrap as feedstock, the recycling manufacturer can take full advantage of the pricing incentives offered by the copper scrap market.

The preferred first step of the present invention is to establish a maximum weight percentage of the one or more contaminants which are contained in the recycled copper product. This provides a guide that can be used later on in the selection of which, and what amounts of, copper scrap feedstock sources can be used to produce the recycled copper product having the desired maximum weight percentage of the one or more contaminants. Of course, these maximum weight percentages may vary among copper scrap recycling operators. In accordance with a preferred embodiment of the present invention, the recycled copper scrap product has a copper content of at least about 99.9 weight percent or more, which would result in a total contaminant content of about 0.1 weight percent or less. However, within that desired total contaminant content, it is typically preferred to have certain contaminants below a certain amount or weight percentage.

By way of a non-limiting example, an entry is supplied for each and every contaminant of interest. The entry could consists of a weight, a weight percentage, a part per million, or any other suitable measurement expression.

A non-limiting example of the maximum weight percentages of the contaminants contained in the recycled copper product is presented below in Example I:

EXAMPLE I

| Contaminant | Weight Percentage of Contaminant |
|---|---|
| Zinc | 0.02 |
| Tin | 0.015 |
| Lead | 0.015 |
| Iron | 0.015 |
| Aluminum | 0.005 |
| Antimony | 0.01 |
| Arsenic | 0.005 |
| Nickel | 0.025 |
| Bismuth | 0.001 |
| Cadmium | 0.0075 |
| Phosphorous | 0.031 |
| Silicon | 0.005 |
| Sulfur | 0.004 |
| Tellurium | 0.0025 |
| Silver | 0.01 |
| Chromium | 0.005 |
| Magnesium | 0.005 |
| Selenium | 0.0025 |
| Zirconium | 0.005 |
| Manganese | 0.005 |
| Cobalt | 0.0035 |
| Gold | 0.004 |
| Beryllium | 0.001 |

The maximum weight percentages of the various contaminants should be recorded, for example, in a database, on a spreadsheet, or a form of some sort, for later reference. Preferably, this information is recorded on a computer spreadsheet such as EXCEL. The information could be displayed numerically (e.g., in table/column format) or graphically (e.g., in chart/graph format).

Typically, the various categories of copper scrap are delivered to the copper scrap recycling facility and are then physically segregated so as not to inadvertently commingle. Optionally, each lot of each category of copper scrap could then be further segregated by supplier or source. The reason for this is that there may be slight, or sometimes even significant, variations in chemical composition from lot to lot and from supplier to supplier.

A sample of each category of copper scrap is chemically analyzed, in accordance with generally known metallurgical techniques, so as to determine the composition and weight and/or weight percentage of the various contaminants contained therein. This is a representative analysis in that only a small sample is used to determine the chemical composition of the entire lot of that particular type of copper scrap. Presumably, the bulk of the sample will be comprised of copper; however, this will not always be the case. However, the intended purpose of the chemical analysis is to determine the presence of any contaminants, and if any are present, in what amounts or weight percentages they are present.

For each sample, the results of the chemical analysis are recorded, for example, in a database, on a spreadsheet, or a form of some sort. Preferably, this information is recorded on a computer spreadsheet such as EXCEL. The information could be displayed numerically (e.g., in table/column format) or graphically (e.g., in chart/graph format).

By way of a non-limiting example, an entry is supplied for copper, and for each and every contaminant of interest. The entry could consist of a weight, a weight percentage, a part per million, or any other suitable measurement expression. Preferably, the weight percentage of each and every constituent of the sample is recorded on the spreadsheet for future reference. By way of a non-limiting example, the weight percentages of the copper, zinc (if any), tin (if any), lead (if any), iron (if any), aluminum (if any), antimony (if any), arsenic (if any), nickel (if any), bismuth (if any), cadmium (if any), phosphorous (if any), silicon (if any), sulfur (if any), tellurium (if any), silver (if any), chromium (if any), magnesium (if any), selenium (if any), zirconium (if any), manganese (if any), cobalt (if any), gold (if any), beryllium (if any), as well as others, would be recorded.

A non-limiting example of such a system for recording the weight percentages of the constituents of a sample of a particular copper scrap feedstock source is presented below in Example II:

EXAMPLE II

| Copper Scrap Feedstock Source [INSERT DESCRIPTION] | Weight Percentage of Constituent |
|---|---|
| Copper | [INSERT WEIGHT PERCENTAGE] |
| Zinc | [INSERT WEIGHT PERCENTAGE] |
| Tin | [INSERT WEIGHT PERCENTAGE] |
| Lead | [INSERT WEIGHT PERCENTAGE] |
| Iron | [INSERT WEIGHT PERCENTAGE] |
| Aluminum | [INSERT WEIGHT PERCENTAGE] |
| Antimony | [INSERT WEIGHT PERCENTAGE] |
| Arsenic | [INSERT WEIGHT PERCENTAGE] |
| Nickel | [INSERT WEIGHT PERCENTAGE] |
| Bismuth | [INSERT WEIGHT PERCENTAGE] |
| Cadmium | [INSERT WEIGHT PERCENTAGE] |
| Phosphorous | [INSERT WEIGHT PERCENTAGE] |
| Silicon | [INSERT WEIGHT PERCENTAGE] |
| Sulfur | [INSERT WEIGHT PERCENTAGE] |
| Tellurium | [INSERT WEIGHT PERCENTAGE] |
| Silver | [INSERT WEIGHT PERCENTAGE] |
| Chromium | [INSERT WEIGHT PERCENTAGE] |
| Magnesium | [INSERT WEIGHT PERCENTAGE] |
| Selenium | [INSERT WEIGHT PERCENTAGE] |
| Zirconium | [INSERT WEIGHT PERCENTAGE] |
| Manganese | [INSERT WEIGHT PERCENTAGE] |
| Cobalt | [INSERT WEIGHT PERCENTAGE] |
| Gold | [INSERT WEIGHT PERCENTAGE] |
| Beryllium | [INSERT WEIGHT PERCENTAGE] |

The type of "copper scrap feedstock source" refers to the aforementioned categories of copper scrap, such as No. 1 heavy scrap copper, No. 2 heavy scrap copper, soldered copper pipe, beryllium copper, light copper scrap, copper turnings, No. 1 bare bright copper wire, No. 1 copper wire, No. 2 copper wire, No. 1 copper wire nodules, No. 2 copper wire nodules, No. 1 insulated copper wire, No. 2 insulated copper wire, No. 3 insulated copper wire, copper/aluminum BX cable, copper/steel BX cable, copper/fractional electric motors, copper/large electric motors, copper/sealed motors, copper/aluminum rads, copper content, and combinations thereof. The phrase "insert weight percentage" is merely explanatory in nature and need not be part of the actual physical form or spreadsheet or database template. Of course, it should be noted that if a particular constituent is not present in the particular copper scrap feedstock source, then the weight percentage would be indicated as zero.

This process is then preferably repeated for each and every type of copper scrap feedstock source available to the copper scrap recycling facility operator. At this point, the copper scrap recycling facility operator would have a contaminant profile for each and every type of copper scrap feedstock source that could be easily recalled, modified, and updated.

A non-limiting example of such a system for recording the weight percentages of the constituents of a sample of all of the available copper scrap feedstock sources is presented below in Example III:

EXAMPLE III

| Constituent | Copper Scrap Feedstock Source #1 [INSERT DESCRIPTION] Weight Percentage | Copper Scrap Feedstock Source #2 [INSERT DESCRIPTION] Weight Percentage | Copper Scrap Feedstock Source #3 [INSERT DESCRIPTION] Weight Percentage |
|---|---|---|---|
| Copper | [INSERT WEIGHT PERCENTAGE] | [INSERT WEIGHT PERCENTAGE] | [INSERT WEIGHT PERCENTAGE] |
| Zinc | [INSERT WEIGHT PERCENTAGE] | [INSERT WEIGHT PERCENTAGE] | [INSERT WEIGHT PERCENTAGE] |
| Tin | [INSERT WEIGHT PERCENTAGE] | [INSERT WEIGHT PERCENTAGE] | [INSERT WEIGHT PERCENTAGE] |
| Lead | [INSERT WEIGHT PERCENTAGE] | [INSERT WEIGHT PERCENTAGE] | [INSERT WEIGHT PERCENTAGE] |
| Iron | [INSERT WEIGHT PERCENTAGE] | [INSERT WEIGHT PERCENTAGE] | [INSERT WEIGHT PERCENTAGE] |
| Aluminum | [INSERT WEIGHT PERCENTAGE] | [INSERT WEIGHT PERCENTAGE] | [INSERT WEIGHT PERCENTAGE] |
| Antimony | [INSERT WEIGHT PERCENTAGE] | [INSERT WEIGHT PERCENTAGE] | [INSERT WEIGHT PERCENTAGE] |
| Arsenic | [INSERT WEIGHT PERCENTAGE] | [INSERT WEIGHT PERCENTAGE] | [INSERT WEIGHT PERCENTAGE] |
| Nickel | [INSERT WEIGHT PERCENTAGE] | [INSERT WEIGHT PERCENTAGE] | [INSERT WEIGHT PERCENTAGE] |
| Bismuth | [INSERT WEIGHT PERCENTAGE] | [INSERT WEIGHT PERCENTAGE] | [INSERT WEIGHT PERCENTAGE] |
| Cadmium | [INSERT WEIGHT PERCENTAGE] | [INSERT WEIGHT PERCENTAGE] | [INSERT WEIGHT PERCENTAGE] |
| Phosphorus | [INSERT WEIGHT PERCENTAGE] | [INSERT WEIGHT PERCENTAGE] | [INSERT WEIGHT PERCENTAGE] |
| Silicon | [INSERT WEIGHT PERCENTAGE] | [INSERT WEIGHT PERCENTAGE] | [INSERT WEIGHT PERCENTAGE] |
| Sulfur | [INSERT WEIGHT PERCENTAGE] | [INSERT WEIGHT PERCENTAGE] | [INSERT WEIGHT PERCENTAGE] |
| Tellurium | [INSERT WEIGHT PERCENTAGE] | [INSERT WEIGHT PERCENTAGE] | [INSERT WEIGHT PERCENTAGE] |
| Silver | [INSERT WEIGHT PERCENTAGE] | [INSERT WEIGHT PERCENTAGE] | [INSERT WEIGHT PERCENTAGE] |
| Chromium | [INSERT WEIGHT PERCENTAGE] | [INSERT WEIGHT PERCENTAGE] | [INSERT WEIGHT PERCENTAGE] |
| Magnesium | [INSERT WEIGHT PERCENTAGE] | [INSERT WEIGHT PERCENTAGE] | [INSERT WEIGHT PERCENTAGE] |
| Selenium | [INSERT WEIGHT PERCENTAGE] | [INSERT WEIGHT PERCENTAGE] | [INSERT WEIGHT PERCENTAGE] |
| Zirconium | [INSERT WEIGHT PERCENTAGE] | [INSERT WEIGHT PERCENTAGE] | [INSERT WEIGHT PERCENTAGE] |
| Manganese | [INSERT WEIGHT PERCENTAGE] | [INSERT WEIGHT PERCENTAGE] | [INSERT WEIGHT PERCENTAGE] |
| Cobalt | [INSERT WEIGHT PERCENTAGE] | [INSERT WEIGHT PERCENTAGE] | [INSERT WEIGHT PERCENTAGE] |
| Gold | [INSERT WEIGHT PERCENTAGE] | [INSERT WEIGHT PERCENTAGE] | [INSERT WEIGHT PERCENTAGE] |
| Beryllium | [INSERT WEIGHT PERCENTAGE] | [INSERT WEIGHT PERCENTAGE] | [INSERT WEIGHT PERCENTAGE] |

Again, the type of "copper scrap feedstock source" refers to the aforementioned categories of copper scrap. It should be noted that the constituents of many different types of copper scrap feedstock sources could be recorded in this manner, and not just three as shown above. Additionally, within a particular type of a copper scrap feedstock source, each supplier source of that copper scrap feedstock source could be recorded separately, especially if there is significant lot-to-lot variation observed. The phrase "insert weight percentage" is merely explanatory in nature and need not be part of the actual physical form or-spreadsheet or database template. Of course, it should be noted that if a particular constituent is not present in the particular copper scrap feedstock source, then the weight percentage would be indicated as zero.

Once all of the relevant information has been recorded, the copper recycling facility operator can now proceed to the important process of selecting which copper scrap feedstock sources will be used and in what amounts. Additionally, it should be noted that copper cathode may also be considered a type of copper scrap, in that relatively small waste pieces of copper cathode may be generated during various casting processes. Being that copper cathode typically has a copper content of at least about 99.99 weight percent or more, it is a very valuable copper scrap feedstock source, although it should preferably be used sparingly due to it's relatively high cost.

One of the main features of the present invention is that it allows the copper scrap facility operator to pre-plan the copper scrap charge that is be introduced into the furnace and melted so as to form the recycled copper product into any number of desired shapes (e.g., billets, ingots, and the like). In this manner, careful control over the weight percentages of various contaminants can be achieved so as to eliminate or at least lessen the need for additional processing or refining of the recycled copper product.

It is important to note that if the contaminants are expressed in terms of weight percentage, it is therefore important to keep track of how much weight of each copper scrap feedstock source is being added to the planned copper scrap charge, so as to be able to calculate the average weight percentage of any particular contaminant. By way of a non-limiting example, consider that 500 lbs. of copper scrap feedstock source A has a zinc weight percentage of 0.01, whereas 250 lbs. of copper scrap feedstock source B has a zinc weight percentage of 0.02. The average zinc weight percentage of the two combined copper scrap feedstock sources would be approximately 0.013. By using a suitable computer program, the average weight percentage of the various contaminants could be automatically calculated as the information is being input.

Preferably, a form or template, preferably computer-based, is used to design the composition of the copper scrap charge that is to be loaded into the furnace. The initial step is for the operator to insert the specific copper scrap feedstock source that is first considered for adding to the charge as well as the amount (e.g., weight) that is desired. Once this is done, the computer program used to create the form or template preferably automatically inserts what weight percent of the total charge that this amount represents, as well as the average weight percent of each and every contaminant present in that particular copper scrap feedstock source. Additionally, the computer program used to create the form or template preferably also automatically inserts the maximum weight percentage of each of the various contaminants that are permitted in the recycled copper product (e.g., in case the operator forgets). Alternatively, the form or template could be designed so as to highlight (e.g., boldface, flashing, or colored) one or more average contaminant weight percentages that are above the pre-established maximum weight percentages of the contaminants that are permitted in the recycled copper product.

By way of a non-limiting example, such a form or template is shown below in Example IV:

EXAMPLE IV

| Copper Scrap Feedstock Source | Total weight (lbs.) | Weight percent of total charge | Average Zinc weight percent | Average Tin weight percent | Average Lead weight percent |
| --- | --- | --- | --- | --- | --- |
| #1 [Insert description] | 30,000 | 100 | 0.03 | 0.02 | 0.02 |
| Maximum average weight percent permitted in recycled cooper product | | | 0.02 | 0.015 | 0.015 |

In this case, only one copper scrap feedstock source has been entered, accordingly, the "average" weight percent of the contaminants will merely be the weight percent of that contaminant contained in the particular feedstock source as there is nothing to average it with. Additionally, although only zinc, tin, and lead are shown on this form, it will be appreciated that all of the average weight percentages of the contaminants would typically be displayed. Although the order of entering particular copper scrap feedstock sources is up to the operator, in practice an operator will typically attempt to use up as much of the inexpensive and low-grade copper scrap available as possible before using relatively more expensive copper scrap.

It is important to determine whether the weight percentage of any of the contaminants which is present in the copper scrap feedstock source will exceed the established maximum weight percentage of any of the contaminants in the recycled copper product. If the contaminant levels are acceptable, the copper scrap feedstock source can then be charged into the furnace, melted, and then permitted to conform to a predetermined shape.

However, as can be seen from Example IV, copper scrap feedstock source #1 has unacceptable levels of zinc, tin, and lead. Therefore, if the copper scrap charge consisted solely of just this material, the resulting recycled copper product would have unacceptably high levels of zinc, tin, and lead and therefore would have to be further processed and refined. Accordingly, the operator easily and automatically recognizes that the composition of the charge must be modified in order to bring all of the contaminant levels down below the acceptable limits. Thus, if the weight percentage of any contaminant which is present in the copper scrap feedstock source will exceed the established maximum weight percentage of any contaminant in the recycled copper product, then the copper scrap feedstock source is combined with at least one other copper scrap feedstock source so as to cause the combined copper scrap feedstock sources to have a weight percentage of any of the contaminants which is present in the combined copper scrap feedstock sources to not exceed the established maximum weight percentage of any of the contaminants in the recycled copper product. Thus, the operator can either add copper cathode or one or more different types of copper scrap feedstock sources to the planned charge, or alternatively, remove some of the first copper scrap material and then add copper cathode or one or more different types of copper scrap feedstock sources to the modified planned charge.

With regard to the selection of a second copper scrap feedstock source, the operator can easily refer to the recorded weight percentages of the constituents/contaminants of the samples of all of the available copper scrap feedstock sources. In this case, the operator would preferably attempt to locate the least expensive copper scrap feedstock source that would aid in reducing the levels of zinc, tin, and lead to acceptable levels.

By way of a non-limiting example, such a form or template is shown below in Example V, after the operator has selected a second copper scrap feedstock source to add to the planned charge:

EXAMPLE V

| Copper Scrap Feedstock Source | Total weight (lbs.) | Weight percent of total charge | Average Zinc weight percent | Average Tin weight percent | Average Lead weight percent |
|---|---|---|---|---|---|
| #1 [Insert description] | 30,000 | 75 | 0.02 | 0.0175 | 0.0175 |
| #2 [Insert description] | 10,000 | 25 | | | |
| Maximum average weight percent permitted in recycled cooper product | N/A | N/A | 0.02 | 0.015 | 0.015 |

In this case, both the first and the second copper scrap feedstock sources have been entered, and accordingly the "average" weight percent of the contaminants will merely be the total weight of that contaminant contained in both feedstock sources divided by the total weight of both feedstock sources. Preferably, this calculation is performed automatically by a suitable computer program.

As can be seen from Example V, the combined copper scrap feedstock sources #1 and #2 have acceptable levels of zinc, but still have excess amounts of tin and lead. Therefore, if the copper scrap charge consisted solely of just this material, the resulting recycled copper product would have unacceptably high levels of tin and lead and therefore would have to be further processed and refined. Accordingly, the operator again easily and automatically recognizes that the composition of the charge must be further modified in order to bring all of the contaminant levels down below the acceptable limits. Again, the operator can either add copper cathode or one or more different types of copper scrap feedstock sources to the planned charge, or alternatively, remove some of the first and/or second copper scrap materials and then add copper cathode or one or more different types of copper scrap feedstock sources to the modified planned charge.

With regard to the selection of a third copper scrap feedstock source, the operator can again easily refer to the recorded weight percentages of the constituents/contaminants of the samples of all of the available copper scrap feedstock sources. In this case, the operator would preferably attempt to locate the least expensive copper scrap feedstock source that would further aid in reducing the levels of tin and lead to acceptable levels.

By way of a non-limiting example, such a form or template is shown below in Example VI, after the operator has selected a third copper scrap feedstock source to add to the planned charge:

EXAMPLE VI

| Copper Scrap Feedstock Source | Total weight (lbs.) | Weight percent of total charge | Average Zinc weight percent | Average Tin weight percent | Average Lead weight percent |
|---|---|---|---|---|---|
| #1 [Insert description] | 30,000 | 60 | 0.01 | 0.01 | 0.01 |
| #2 [Insert description] | 10,000 | 20 | | | |
| #3 [Insert description] | 10,000 | 20 | | | |
| Maximum average weight percent permitted in recycled cooper product | N/A | N/A | 0.02 | 0.015 | 0.015 |

In this case, the first, second, and third copper scrap feedstock sources have been entered, and accordingly the "average" weight percent of the contaminants will merely be the total weight of that contaminant contained in all three combined feedstock sources divided by the total weight of all three combined feedstock sources. Preferably, this calculation is performed automatically by a suitable computer program.

As can be seen from Example VI, the combined copper scrap feedstock sources #1, #2, and #3 have acceptable levels of zinc, tin, and lead. Therefore, if the copper scrap charge consisted solely of just this material, the resulting recycled copper product would have acceptable levels of all three contaminants, without the need for any significant further processing or refining. Accordingly, the operator easily and automatically recognizes that the composition of the charge need not be further modified in order to bring all of the contaminant levels down below acceptable limits. Of course, if the charge will accommodate more copper scrap feedstock, the operator can input this information into the form or template to ensure that the additional material does not cause one or more contaminants to exceed the pre-established maximum weight percentages.

The operator can then instruct his workers to assemble the appropriate amounts (e.g., weights) of each of the three copper scrap feedstocks sources and bring them to the furnace where they are then charged therein, melted, and formed into any desired shape or configuration. Preferably, the recycled copper product has a copper content of about 99.9 weight percent or more.

The present invention saves a tremendous amount of time, effort, and cost, as the copper scrap charge can be optimized in terms of using the least expensive copper scrap feedstock sources to produce a recycled copper product that has acceptable levels of contaminants. In this manner, the use of copper cathode can be eliminated, or at least lessened substantially, in the recycling of copper scrap. Accordingly, the present invention permits the use of relatively low grades of copper scrap to make up significant amounts of the copper scrap charge, thus eliminating or at least lessening the use of relatively higher grades of copper scrap. As a result, an operator that utilizes the system of the present invention can optimize the selection of copper scrap feedstocks to produce recycled copper products that have acceptable levels of contaminants therein at the most economical cost possible.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A system for forming a recycled metal product from at least one metal scrap feedstock source, wherein the at least one metal scrap feedstock source contains at least one contaminant, comprising:
   establishing a maximum weight percentage of the at least one contaminant in the recycled metal product;
   determining the weight percentage of the at least one contaminant which is present in the at least one metal scrap feedstock source;
   determining whether the weight percentage of the at least one contaminant which is present in the at least one metal scrap feedstock source will exceed the established maximum weight percentage of the at least one contaminant in the recycled metal product; and
   if the weight percentage of the at least one contaminant which is present in the at least one metal scrap feedstock source will exceed the established maximum weight percentage of the at least one contaminant in the recycled metal product, then combining the at least one metal scrap feedstock source with at least one other metal scrap feedstock source so as to cause the combined metal scrap feedstock sources to have a weight percentage of the at least one contaminant which is present in the combined metal scrap feedstock sources to not exceed the established maximum weight percentage of the at least one contaminant in the recycled metal product.

2. The invention according to claim 1, wherein the at least one contaminant is selected from the group consisting of zinc, tin, lead, iron, aluminum, antimony, arsenic, nickel, bismuth, cadmium, phosphorous, silicon, sulfur, tellurium, silver, chromium, magnesium, selenium, zirconium, manganese, cobalt, gold, beryllium, and combinations thereof.

3. The invention according to claim 2, wherein the weight percent of the zinc in the recycled metal product is about 0.02 or less.

4. The invention according to claim 2, wherein the weight percent of the tin in the recycled metal product is about 0.015 or less.

5. The invention according to claim 2, wherein the weight percent of the lead in the recycled metal product is about 0.015 or less.

6. The invention according to claim 2, wherein the weight percent of the iron in the recycled metal product is about 0.015 or less.

7. The invention according to claim 2, wherein the weight percent of the aluminum in the recycled metal product is about 0.005 or less.

8. The invention according to claim 1, wherein the recycled metal product has a metal content of about 99.9 weight percent or more.

9. The invention according to claim 1, further comprising recording the weight percentage of the at least one contaminant which is present in the at least one metal scrap feedstock source.

10. The invention according to claim 1, further comprising melting the at least one metal scrap feedstock source and permitting the molten at least one metal scrap feedstock source to conform to a pre-determined shape.

11. The invention according to claim 1, further comprising melting the combined metal scrap feedstock sources and permitting the molten combined metal scrap feedstock sources to conform to a pre-determined shape.

12. The invention according to claim 1, further comprising:
    determining whether the least one contaminant is present in the at least one other metal scrap feedstock source; and
    determining the weight percentage of the at least one contaminant which is present in the at least one other metal scrap feedstock source.

13. The invention according to claim 12, wherein the at least one contaminant is selected from the group consisting of zinc, tin, lead, iron, aluminum, antimony, arsenic, nickel, bismuth, cadmium, phosphorous, silicon, sulfur, tellurium, silver, chromium, magnesium, selenium, zirconium, manganese, cobalt, gold, beryllium, and combinations thereof.

14. The invention according to claim 12, further comprising recording the weight percentage of the at least one contaminant which is present in the at least one other metal scrap feedstock source.

15. The invention according to claim 12, further comprising determining the average weight percentage of the at least one contaminant which is present in the at least one metal scrap feedstock source and the at least one other metal scrap feedstock source.

16. The invention according to claim 15, further comprising determining whether the average weight percentage of the at least one contaminant which is present in the at least one metal scrap feedstock source and the at least one other metal scrap feedstock source will exceed the established maximum weight percentage of the at least one contaminant in the recycled metal product.

17. The invention according to claim 16, wherein if the average weight percentage of the at least one contaminant which is present in the at least one metal scrap feedstock source and the at least one other metal scrap feedstock source will exceed the established maximum weight percentage of the at least one contaminant in the recycled metal product, then combining the at least one metal scrap feedstock source and the at least one other metal scrap feedstock source with another metal scrap feedstock source so as to cause the combined metal scrap feedstock sources to have a weight percentage of the at least one contaminant which is present in the combined metal scrap feedstock sources to not exceed the established maximum weight percentage of the at least one contaminant in the recycled metal product.

18. The invention according to claim 17, further comprising:
    determining whether the least one contaminant is present in the another metal scrap feedstock source; and
    determining the weight percentage of the at least one contaminant which is present in the another metal scrap feedstock source.

19. The invention according to claim 18, wherein the at least one contaminant is selected from the group consisting of zinc, tin, lead, iron, aluminum, antimony, arsenic, nickel, bismuth, cadmium, phosphorous, silicon, sulfur, tellurium, silver, chromium, magnesium, selenium, zirconium, manganese, cobalt, gold, beryllium, and combinations thereof.

20. The invention according to claim 18, further comprising recording the weight percentage of the at least one contaminant which is present in the another metal scrap feedstock source.

21. The invention according to claim 18, further comprising determining the average weight percentage of the at least on e contaminant which is present in the at least one metal scrap feedstock source, the at least one other metal scrap feedstock source, and the another metal scrap feedstock source.

22. The invention according to claim 21, further comprising determining whether the average weight percentage of the at least one contaminant which is present in the at least one metal scrap feedstock source, the at least one other metal scrap feedstock source, and the another metal scrap feedstock source will exceed the established maximum weight percentage of the at least one contaminant in the recycled metal product.

23. A system for forming a recycled metal product from a first metal scrap feedstock source and a second metal scrap feedstock source, wherein the first metal scrap feedstock source and a second metal scrap feedstock source contain at least one contaminant, comprising:
    establishing a maximum weight percentage of the at least one contaminant in the recycled metal product;
    determining the weight percentage of the at least one contaminant which is present in the first metal scrap feedstock source;
    determining the weight percentage of the at least one contaminant which is present in the second metal scrap feedstock source;
    determining the average weight percentage of the at least one contaminant which is present in the first metal scrap feedstock source and the second metal scrap feedstock source;
    determining whether the average weight percentage of the at least one contaminant which is present in the first metal scrap feedstock source and the second metal scrap feedstock source will exceed the established maximum weight percentage of the at least one contaminant in the recycled metal product; and
    if the average weight percentage of the at least one contaminant which is present in the first metal scrap feedstock source and the second metal scrap feedstock source will exceed the established maximum weight percentage of the at least one contaminant in the recycled metal product, then combining the first metal scrap feedstock source and the second metal scrap feedstock source with a third metal scrap feedstock source so as to cause the combined metal scrap feedstock sources to have an average weight percentage of the at least one contaminant which is present in the combined metal scrap feedstock sources to not exceed the established maximum weight percentage of the at least one contaminant in the recycled metal product.

24. The invention according to claim 22, wherein the at least one contaminant is selected from the group consisting of zinc, tin, lead, iron, aluminum, antimony, arsenic, nickel, bismuth, cadmium, phosphorous, silicon, sulfur, tellurium, silver, chromium, magnesium, selenium, zirconium, manganese, cobalt, gold, beryllium, and combinations thereof.

25. The invention according to claim 23, wherein the weight percent of the zinc in the recycled metal product is about 0.02 or less.

26. The invention according to claim 23, wherein the weight percent of the tin in the recycled metal product is about 0.015 or less.

27. The invention according to claim 23, wherein the weight percent of the lead in the recycled metal product is about 0.015 or less.

28. The invention according to claim 23, wherein the weight percent of the iron in the recycled metal product is about 0.015 or less.

29. The invention according to claim 23, wherein the weight percent of the aluminum in the recycled metal product is about 0.005 or less.

30. The invention according to claim 23, wherein the recycled metal product has a metal content of about 99.9 weight percent or more.

31. The invention according to claim 22, further comprising recording the weight percentage of the at least one contaminant which is present in the first metal scrap feedstock source.

32. The invention according to claim 22, further comprising melting the first metal scrap feedstock source and the second metal scrap source and permitting the molten combined metal scrap feedstock sources to conform to a pre-determined shape.

33. The invention according to claim 22, further comprising melting the combined metal scrap feedstock sources and permitting the molten combined metal scrap feedstock sources to conform to a pre-determined shape.

34. The invention according to claim 22, further comprising recording the weight percentage of the at least one contaminant which is present in the second metal scrap feedstock source.

35. The invention according to claim 22, further comprising:
    determining whether the least one contaminant is present in the third metal scrap feedstock source; and
    determining the weight percentage of the at least one contaminant which is present in the third metal scrap feedstock source.

36. The invention according to claim 34, wherein the at least one contaminant is selected from the group consisting of zinc, tin, lead, iron, aluminum, antimony, arsenic, nickel, bismuth, cadmium, phosphorous, silicon, sulfur, tellurium, silver, chromium, magnesium, selenium, zirconium, manganese, cobalt, gold, beryllium, and combinations thereof.

37. The invention according to claim 34, further comprising recording the weight percentage of the at least one contaminant which is present in the third metal scrap feedstock source.

38. The invention according to claim 34, further comprising determining the average weight percentage of the at least one contaminant which is present in the combined metal scrap feedstock sources.

39. The invention according to claim 37, further comprising determining whether the average weight percentage of the at least one contaminant which is present in the combined metal scrap feedstock sources will exceed the established maximum weight percentage of the at least one contaminant in the recycled metal product.

40. A system for forming a recycled metal product from a first metal scrap feedstock source and a second metal scrap feedstock source, wherein the first metal scrap feedstock source and a second metal scrap feedstock source contain at least one contaminant, comprising:
    establishing a maximum weight percentage of the at least one contaminant in the recycled metal product;
    determining the weight percentage of the at least one contaminant which is present in the first metal scrap feedstock source;

recording the weight percentage of the at least one contaminant which is present in the first metal scrap feedstock source;

determining the weight percentage of the at least one contaminant which is present in the second metal scrap feedstock source;

recording the weight percentage of the at least one contaminant which is present in the second metal scrap feedstock source;

determining the average weight percentage of the at least one contaminant which is present in the first metal scrap feedstock source and the second metal scrap feedstock source based upon the recorded weight percentages of the at least one contaminant which is present in the first and second metal scrap feedstock sources;

determining whether the average weight percentage of the at least one contaminant which is present in the first metal scrap feedstock source and the second metal scrap feedstock source will exceed the established maximum weight percentage of the at least one contaminant in the recycled metal product; and if the average weight percentage of the at least one contaminant which is present in the first metal scrap feedstock source and the second metal scrap feedstock source will exceed the established maximum weight percentage of the at least one contaminant in the recycled metal product, then combining the first metal scrap feedstock source and the second metal scrap feedstock source with a third metal scrap feedstock source so as to cause the combined metal scrap feedstock sources to have an average weight percentage of the at least one contaminant which is present in the combined metal scrap feedstock sources to not exceed the established maximum weight percentage of the at least one contaminant in the recycled metal product.

41. The invention according to claim 39, wherein the at least one contaminant is selected from the group consisting of zinc, tin, lead, iron, aluminum, antimony, arsenic, nickel, bismuth, cadmium, phosphorous, silicon, sulfur, tellurium, silver, chromium, magnesium, selenium, zirconium, manganese, cobalt, gold, beryllium, and combinations thereof.

42. The invention according to claim 40, wherein the weight percent of the zinc in the recycled metal product is about 0.02 or less.

43. The invention according to claim 40, wherein the weight percent of the tin in the recycled metal product is about 0.015 or less.

44. The invention according to claim 40, wherein the weight percent of the lead in the recycled metal product is about 0.015 or less.

45. The invention according to claim 40, wherein the weight percent of the iron in the recycled metal product is about 0.015 or less.

46. The invention according to claim 40, wherein the weight percent of the aluminum in the recycled metal product is about 0.005 or less.

47. The invention according to claim 39, wherein the recycled metal product has a metal content of about 99.9 weight percent or more.

48. The invention according to claim 39, further comprising melting the first metal scrap feedstock source and the second metal scrap source and permitting the molten combined metal scrap feedstock sources to conform to a pre-determined shape.

49. The invention according to claim 39, further comprising melting the combined metal scrap feedstock sources and permitting the molten combined metal scrap feedstock sources to conform to a pre-determined shape.

50. The invention according to claim 39, further comprising:

determining whether the least one contaminant is present in the third metal scrap feedstock source; and determining the weight percentage of the at least one contaminant which is present in the third metal scrap feedstock source.

51. The invention according to claim 49, wherein the at least one contaminant is selected from the group consisting of zinc, tin, lead, iron, aluminum, antimony, arsenic, nickel, bismuth, cadmium, phosphorous, silicon, sulfur, tellurium, silver, chromium, magnesium, selenium, zirconium, manganese, cobalt, gold, beryllium, and combinations thereof.

52. The invention according to claim 50, further comprising determining the average weight percentage of the at least one contaminant which is present in the combined metal scrap feedstock sources.

53. The invention according to claim 51, further comprising determining whether the average weight percentage of the at least one contaminant which is present in the combined metal scrap feedstock sources will exceed the established maximum weight percentage of the at least one contaminant in the recycled metal product.

* * * * *

UNITED STATES PATENT AND TRADEMARK OFFICE
CERTIFICATE OF CORRECTION

PATENT NO.  : 6,579,339 B1
DATED       : June 17, 2003
INVENTOR(S) : Tommy Jamison et al.

It is certified that error appears in the above-identified patent and that said Letters Patent is hereby corrected as shown below:

Column 1,
Line 28, "an" should be -- a --;

Column 2,
Line 17, "it's" should be -- its --;

Column 6,
Line 7, "consists" should be -- consist --;

Column 8,
Lines 39-40, "Phosphorus" should be -- Phosphorous --;

Column 9,
Line 5, "or-spreadsheet" should be -- or spreadsheet --;
Line 19, "it's" should be -- its --;
Line 23, after "is" insert -- to --;

Column 10,
Line 16, "cooper" should be -- copper --;

Column 11,
Line 28, "cooper" should be -- copper --;

Column 12,
Line 21, "cooper" should be -- copper --.
Line 50, "feedstocks" should be -- feedstock --;

Column 14,
Lines 11 and 56, after "the" insert -- at --;

Column 15,
Line 7, "on e" should be -- one --;

Column 16,
Line 19, after "scrap" insert -- feedstock --;
Line 32, after "the" insert -- at --.

UNITED STATES PATENT AND TRADEMARK OFFICE
CERTIFICATE OF CORRECTION

PATENT NO. : 6,579,339 B1
DATED : June 17, 2003
INVENTOR(S) : Tommy Jamison et al.

It is certified that error appears in the above-identified patent and that said Letters Patent is hereby corrected as shown below:

Column 18,
Line 16, after "scrap" insert -- feedstock --;
Line 26, after "the" insert -- at --.

Signed and Sealed this

Twenty-ninth Day of June, 2004

JON W. DUDAS
*Acting Director of the United States Patent and Trademark Office*